United States Patent [19]
Ahn

[11] Patent Number: 5,772,142
[45] Date of Patent: Jun. 30, 1998

[54] TAPE TENSION CONTROL DEVICE FOR USE IN A VIDEO CASSETTE RECORDER

[75] Inventor: Seong-Ick Ahn, Seoul, Rep. of Korea

[73] Assignee: Daewoo Electronics Co., Ltd., Rep. of Korea

[21] Appl. No.: 866,049

[22] Filed: May 30, 1997

[30] Foreign Application Priority Data

May 31, 1996 [KR] Rep. of Korea ...................... 96-19403

[51] Int. Cl.[6] ............................. G11B 15/46; B65H 23/06
[52] U.S. Cl. ..................................... 242/334.6; 242/421.8
[58] Field of Search ............................ 242/334.6, 421.8, 242/421.9; 360/71, 137

[56] References Cited

U.S. PATENT DOCUMENTS 5,057,961 10/1991 Rayis ....................................... 360/137

FOREIGN PATENT DOCUMENTS 0613131 8/1994 European Pat. Off. .
358196648 11/1983 Japan .................................. 242/334.6

Primary Examiner—John Q. Nguyen
Attorney, Agent, or Firm—Pennie & Edmonds LLP

[57] ABSTRACT

A tape tension control device for use in a video cassette recorder incorporates therein a band brake positioned around a supply reel and a tension lever connected to the band brake and rotatably mounted on a deck. The tape tension control device includes a support post mounted on the deck, a frame provided with an elongated slot through which the support post is retained, a pair of lugs and a fixing plate for connecting the frame to the band brake, and a through threaded-hole formed through a rear wall of the frame, a cap washer for preventing the frame from vertically deviating with respect to the support post. An adjusting screw is engaged into the through threaded-hole.

6 Claims, 4 Drawing Sheets

TAPE TENSION CONTROL DEVICE FOR USE IN A VIDEO CASSETTE RECORDER

FIELD OF THE INVENTION

The present invention relates to a tape tension control device for use in a video cassette recorder; and, more particularly, to an improved tape tension control device which allows an operator to adjust a braking timing of a band brake with respect to an angular position of a tension lever to which the band brake responds, while a tape cassette is seating on a deck.

DESCRIPTION OF THE PRIOR ART

Generally, in a video cassette recorder, the tension of a tape running between the take-up reel and the supply reel must constantly be controlled or adjusted to a desired level depending on an operating mode thereof. For this reason, various types of tape tension control devices have been proposed and used to control or adjust the tension of the running tape.

One of the prior art tape tension control devices is illustrated in FIG. 1. In the illustrated device, after a tape T is arranged onto a predetermined travel path between a supply reel 10 and a take-up reel (not shown), a tension lever 20 pivotally mounted on a deck and having a tension pole 22 at one end thereof is permitted to be biased toward the tape T by a spring 23, thereby allowing the tension pole 22 to come into a contact with the tape T. At the same time, a band brake 11 whose one end is connected to the tension lever 20 via a moving band holder 12 is arranged on an applying position where it can exert a braking force on a supply reel 10 in response to a further rotation of the tension lever 20. The other end of the band brake 11 is supported by an adjusting cam 25 through a fixed band holder 13. The spring 23 is also retained on the adjusting cam 25. By turning a screw 26 on the adjusting cam 25 installed on the deck, it is possible to control a braking timing of the band brake 11 with respect to an orientation of the tension lever 20 by reducing or lengthening the band brake 11.

In the prior art tension control device constructed in this manner, the tension lever 20 pivots about a hinge 21 depending on a tension level of the running tape T coring in contact with the tension pole 22. When the tension lever 20 pivots counterclockwise due to a looseness of the running tape, the band brake 11 connected to the tension lever 20 exerts a braking force on the supply reel 10, thereby increasing the tension of the running tape T.

Although the prior art tension control device described above is capable of performing its assigned task, it has a shortcoming in that it is difficult to control the braking timing of the band brake by adjusting the adjusting cam while a tape cassette is seating on the supply reel of the deck. In the prior art tension control device, in setting the braking timing of the band brake, the tape cassette first has to be seated on the deck, a tension level of the tape is measured by transporting the tape along a predetermined path on the deck, the tape cassette is removed from the deck and the adjusting cam is adjusted according to the measured tension level of the tape, and these processes are rather cumbersome.

SUMMARY OF THE INVENTION

It is, therefore, a primary object of the invention to provide a tape tension control device having an adjusting cam capable of allowing a braking timing of the band brake to be adjusted without removing a tape cassette from a deck.

The above and other objects of the invention are accomplished by providing a tape tension control device for use in a video cassette recorder incorporating therein a band brake positioned around a supply reel and a tension lever connected to the band brake and rotatably mounted on a deck, said device comprising: a support post mounted on the deck; a frame provided with an elongated slot through which the support post is retained, a means for connecting the frame to the band brake, the connecting means being formed on a lead portion of the frame, and a through threaded-hole formed through a rear wall of the frame; a cap washer for preventing the frame from vertically deviating with respect to the support post; and an adjusting screw engaged into the through threaded-hole.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

Figure 1:
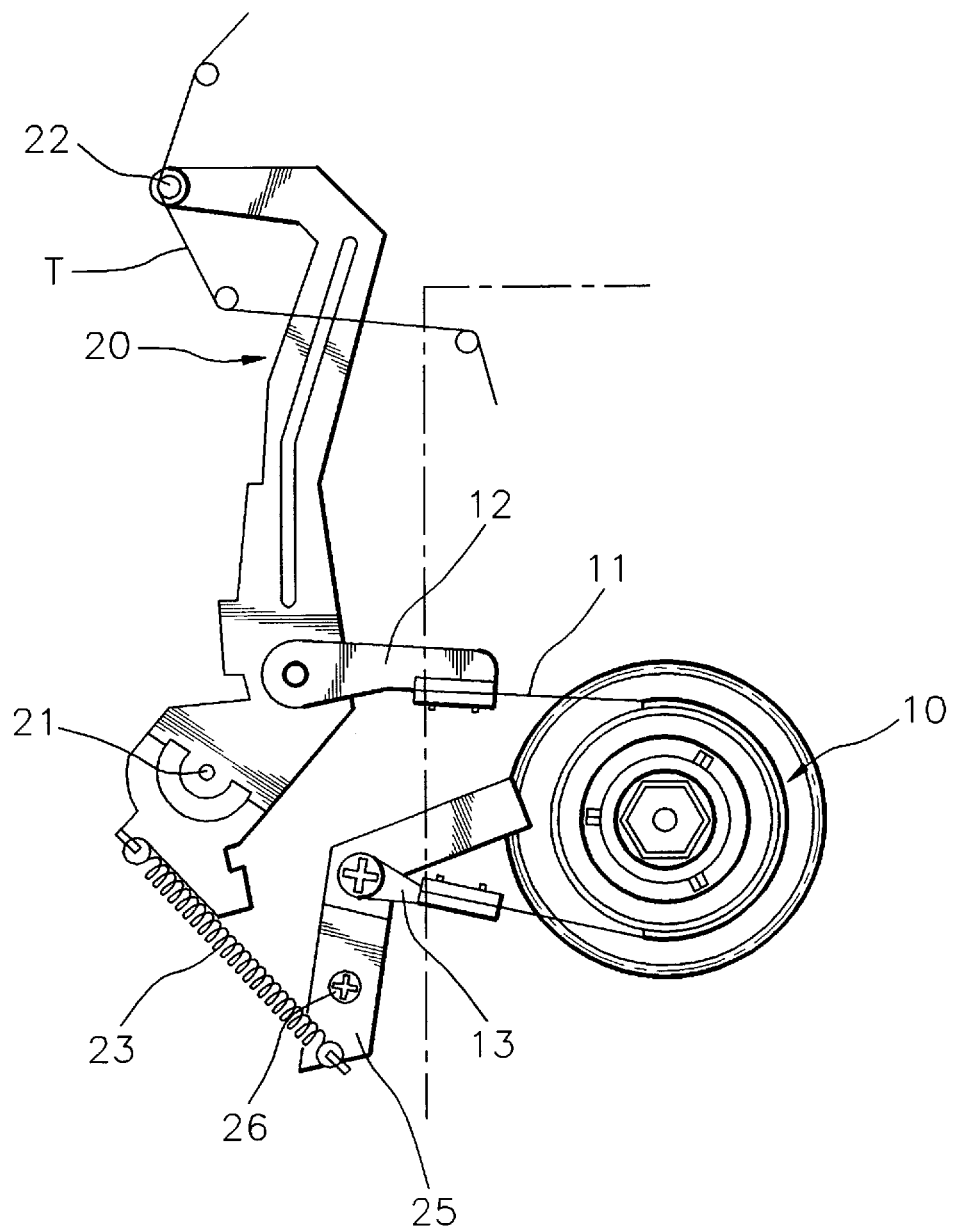
FIG. 1 shows a top plan view of the prior art tape tension control device.
Figure 2:
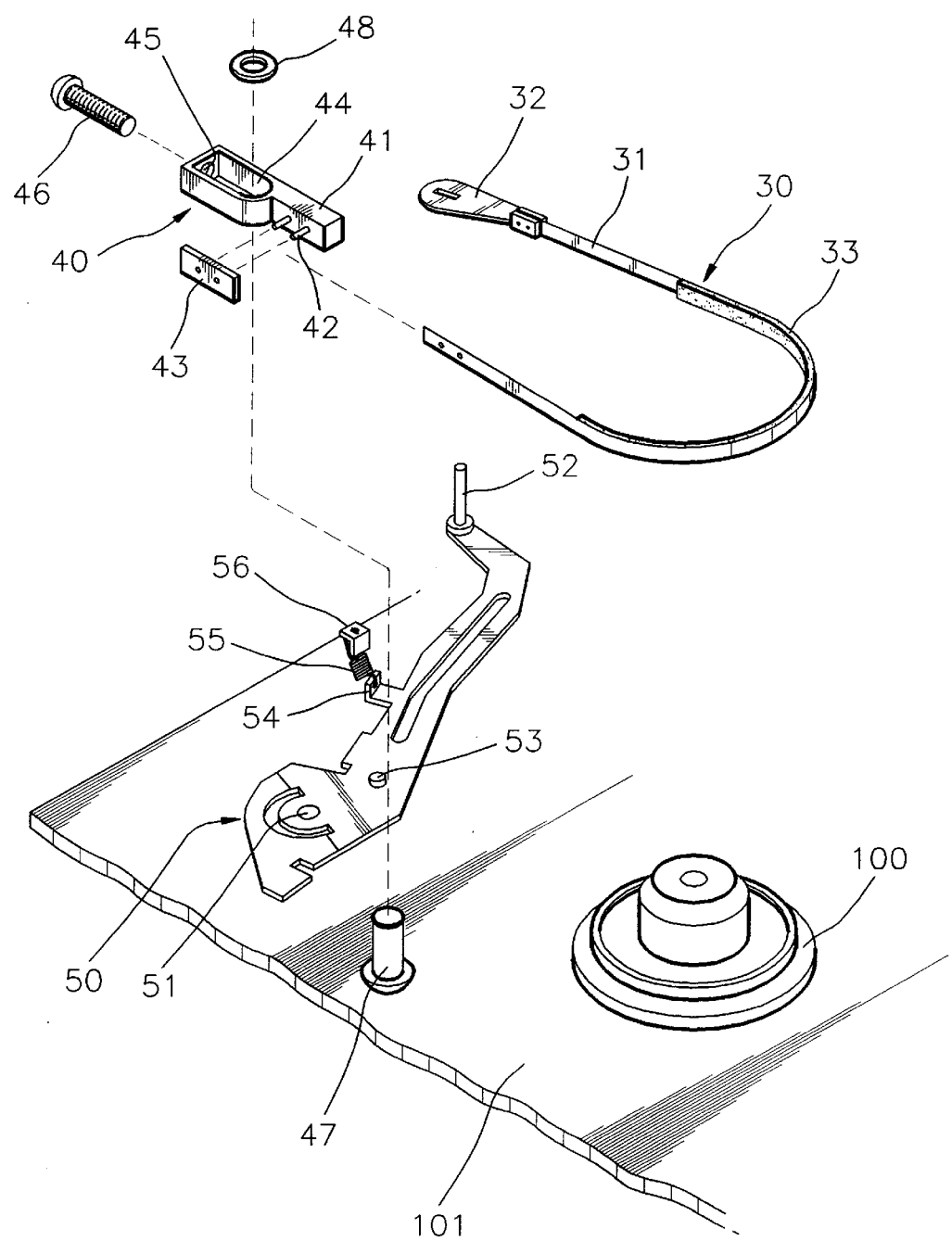
FIG. 2 illustrates a perspective view of the inventive tape tension control device.

Referring to FIG. 2, the inventive tape tension control device for use in a video cassette recorder is largely divided into a brake assembly 30, an adjusting cam assembly 40 and a tension lever assembly 50. The brake assembly 30 includes a felt member 33 positioned around a supply reel 100, which serves as a brake shoe, a film member 31 for supporting the felt member 33 and a moving holder 32 whose one end is connected to the film member 31.

The tension lever assembly 50 is rotatably mounted on a deck 101 through a hinge 51, being biased counterclockwise by a spring 55. The tension lever assembly 50 includes a tension pole 52 vertically protruding therefrom interacting with a tape, a connecting shaft 53 through which the moving holder 32 is rotatably connected to the tension lever assembly 50, and a spring seat 54 to which one end of the spring 55 is retained. The other end of the spring 55 is retained to a protuberance 56 on the deck 101.

The adjusting cam assembly 40 is for adjusting a whole length of the brake assembly 30 to control a braking timing of the brake assembly 30. The adjusting cam assembly 40 is mounted on the deck 101, being connected to the brake assembly 30. The adjusting cam assembly 40 includes a frame 41 having an elongated slot 44 through which a support post 47 on the deck 101 is retained. Preferably, the support post 47 is formed on the deck 101 by an outsert molding method.

Figure 3:
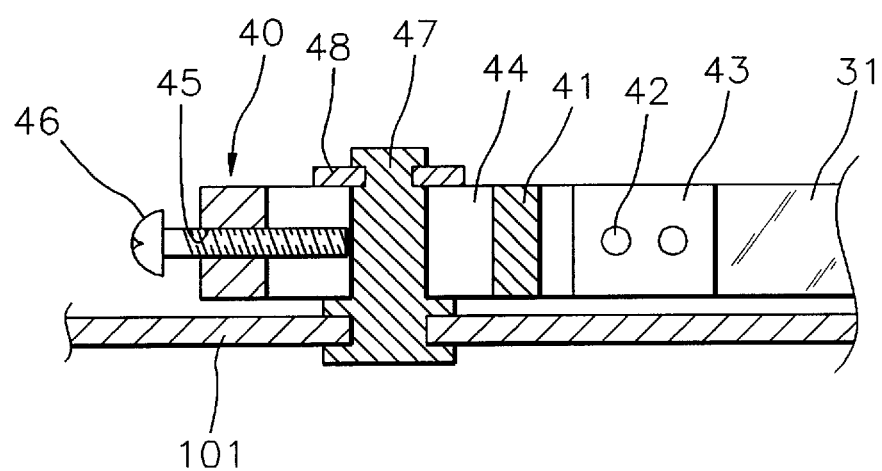
FIG. 3 represents a sectional view of an adjusting cam assembly of the inventive tape tension control device.

The frame 41 is connected to the film member 31 of the brake assembly 30 through the use of a pair of lugs 42 formed on a lead portion of the frame 41 and a fixing plate 43 having a pair of through holes corresponding to the pair of lugs 42. As well shown in FIG. 3, the frame 41 further has a through threaded-hole 45 formed through a rear wall thereof, into which an adjusting screw 46 is engaged.

Further, the adjusting cam assembly 40 includes a cap washer 48 for preventing the frame 41 from being vertically deviated with respect to the support post 47.

In the adjusting cam assembly 40 constructed in this manner, the frame 41 is moved back and forth by rotating the adjusting screw 46 engaged into the through threaded-hole 45, with its end being contacted to the support post 47.

Figure 4:
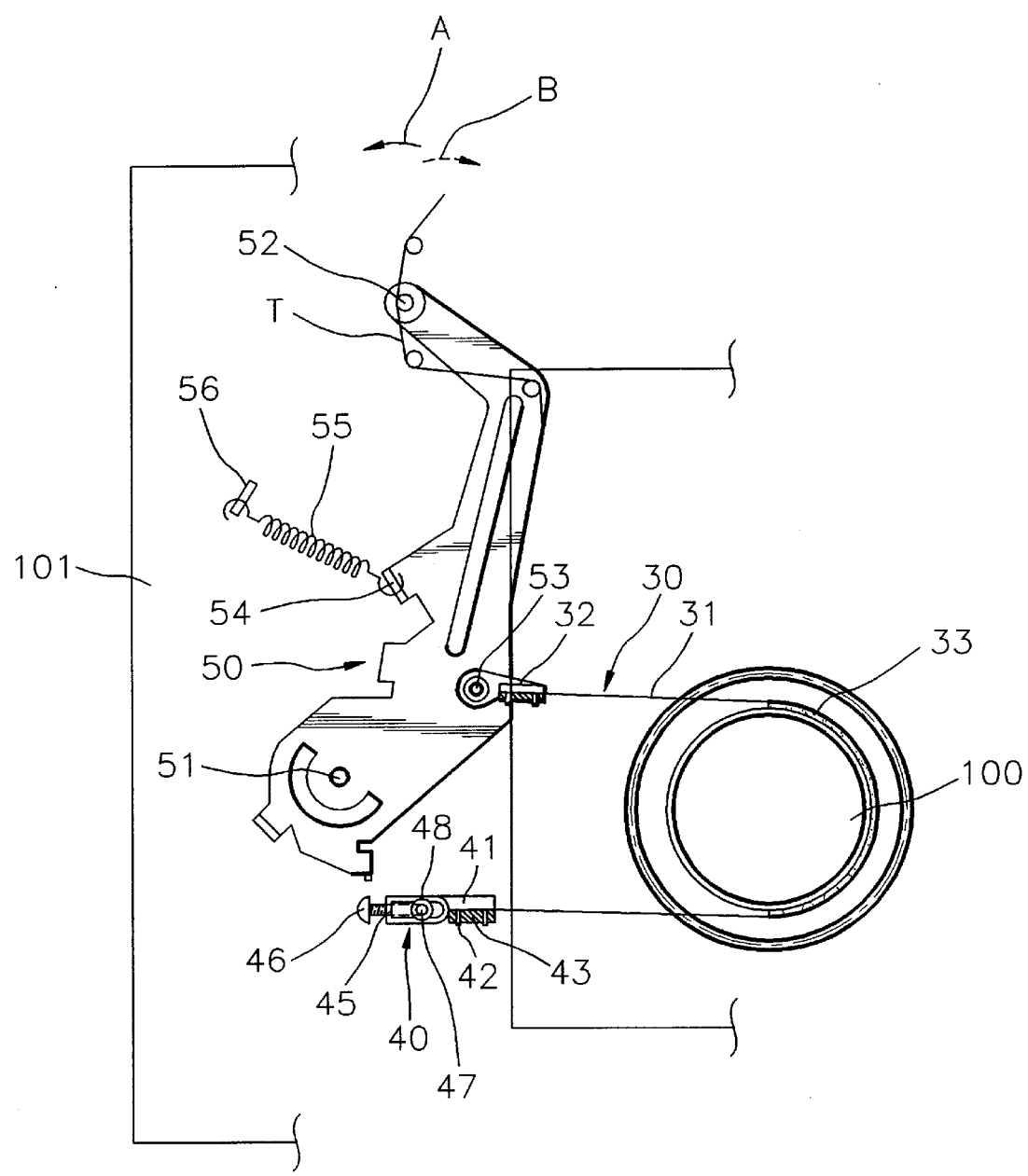
FIG. 4 offers a top plan view of the inventive tape tension control device.

As shown in FIG. 4, the support post 47 is so positioned and arranged on the deck 101 that the adjusting screw 46 retained into the frame 41 remains a visible and allows it to be adjusted even when the tape cassette (not shown) is seating on the deck 101.

An operation of the inventive tape tension control device is now described with reference to FIG. 4.

As shown in FIG. 4, in a reproducing mode or a recording mode of the video cassette recorder, the tape T runs along a predetermined travel path on the deck 101, while in contact with the tension pole 52. When a tension of the running tape T decreases, the tension lever 50 starts to rotate counterclockwise, as indicated with a solid arrow A. Accordingly, the felt member 33 of the brake assembly 30 provides a braking force to the supply reel 100 by pressing thereon in response to a movement of the tension lever 50, rendering the rotation of the supply reel difficult, increasing the tension of the running tape. When the tension of the running tape T exceeds a predetermined value, the running tape T pushes the tension pole 52, thereby rotating the tension pole 52 clockwise as indicated with a broken arrow B, releasing the braking force exerted on the supply reel 100.

Although the invention has been shown and described with respect to the preferred embodiments, it will be understood by those skilled in the art that various changes and modifications may be made without departing from the spirit and scope of the invention as defined in the following claims.

What is claimed is:

1. A tape tension control device for use in a video cassette recorder incorporating therein a band brake positioned around a supply reel and a tension lever connected to one end of the band brake and rotatably mounted on a deck, said device comprising:

a support post mounted on the deck;

a frame provided with an elongated slot through which the support post is retained, a means for connecting the frame to the other end of the band brake, the connecting means being formed on a lead portion of the frame, and a through threaded-hole formed through a rear wall of the frame;

a cap washer mounted to the support post for preventing the frame from vertically deviating with respect to the support post; and an adjusting screw engaged into the through threaded-hole and having an end inserted into the slot and contacting the support post whereby the position of the support post within the slot is adjusted by the screw.

2. The tape tension control device of claim 1, wherein said support post is so positioned and arranged that the adjusting screw remains visible while a tape cassette is seating on the supply reel.

3. The tape tension control device of claim 2, wherein said support post is formed on the deck by using an outsert molding method.

4. The tape tension control device of claim 2, wherein said connecting means comprises a pair of lugs protrusively formed on the lead portion of the frame and a fixing plate provided with a pair of corresponding through-holes to the pair of lugs.

5. The tape tension control device of claim 1, wherein said support post is formed on the deck by using an outsert molding method.

6. The tape tension control device of claim 1, wherein said connecting means comprises a pair of lugs protrusively formed on the lead portion of the frame and a fixing plate provided with a pair of corresponding through-holes to the pair of lugs.

* * * * *